US012753891B1

(12) United States Patent
Bryant

(10) Patent No.: US 12,753,891 B1
(45) Date of Patent: Oct. 6, 2026

(54) SOLAR-POWERED PERSONALIZED STICKERS AND DECALS

(71) Applicant: William Bryant, Orlando, FL (US)

(72) Inventor: William Bryant, Orlando, FL (US)

( * ) Notice: Subject to any disclaimer, the term of this patent is extended or adjusted under 35 U.S.C. 154(b) by 0 days.

(21) Appl. No.: 19/363,769

(22) Filed: Oct. 21, 2025

(51) Int. Cl.

| | |
|---|---|
| ***F21S 9/03*** | (2006.01) |
| ***F21V 3/00*** | (2015.01) |
| ***F21V 23/00*** | (2015.01) |
| ***F21W 121/00*** | (2006.01) |
| ***F21Y 113/00*** | (2016.01) |
| ***F21Y 115/10*** | (2016.01) |
| ***G09F 13/04*** | (2006.01) |

(52) U.S. Cl.
CPC ................ *F21S 9/037* (2013.01); *F21V 3/00* (2013.01); *F21V 23/006* (2013.01); *G09F 13/0463* (2021.05); *F21W 2121/00* (2013.01); *F21Y 2113/00* (2013.01); *F21Y 2115/10* (2016.08)

(58) Field of Classification Search
CPC ........ F21S 9/037; G09F 13/0463; F21V 3/00; F21V 23/006
See application file for complete search history.

(56) References Cited

U.S. PATENT DOCUMENTS 6,160,215 A * 12/2000 Curtin ................ H10F 77/1692 136/251
6,420,008 B1 * 7/2002 Lewis ................ A44C 15/0015 40/442
7,824,078 B2 * 11/2010 Peng ...................... G09F 13/04 362/253
9,297,523 B2 3/2016 Mackay
11,291,259 B1 * 4/2022 Dugosh .................... F21V 5/04
11,490,495 B2 11/2022 Whitby
11,776,432 B1 * 10/2023 Lewis ..................... C09J 7/401 428/40.1
D1,039,612 S 8/2024 Yun
2002/0106471 A1 * 8/2002 Kuo ...................... B32B 27/065 428/41.9
2012/0176789 A1 7/2012 Jhannes
2015/0351192 A1 * 12/2015 Newton ............... G09G 3/3406 315/150

(Continued)

FOREIGN PATENT DOCUMENTS

EP 3893158 8/2023

*Primary Examiner* — Bryon T Gyllstrom

(57) ABSTRACT

The solar-powered personalized stickers and decals is a display. The solar-powered personalized stickers and decals is an illuminated structure. The solar-powered personalized stickers and decals visibly displays an image into the environment. The solar-powered personalized stickers and decals provides the image with illumination that allows the image to be seen at night. The solar-powered personalized stickers and decals is an independently powered device. By independently powered is meant that the solar-powered personalized stickers and decals can illuminate the displayed image without an electric connection to an external power source. The solar-powered personalized stickers and decals incorporates a lamp structure, an overlay structure, and a control circuit. The lamp structure and the overlay sheeting structure are flexible sheeting structures. The overlay sheeting structure overlays the lamp structure. The control circuit controls the illumination of the solar-powered personalized stickers and decals.

7 Claims, 5 Drawing Sheets

(56) References Cited

U.S. PATENT DOCUMENTS

| | | | | |
|---|---|---|---|---|
| 2017/0254518 | A1* | 9/2017 | Vasylyev | F21V 21/14 |
| 2019/0051639 | A1* | 2/2019 | Hussain | H10W 70/688 |
| 2024/0272862 | A1* | 8/2024 | Tobias | G09F 21/041 |

* cited by examiner

SOLAR-POWERED PERSONALIZED STICKERS AND DECALS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The solar-powered personalized stickers and decals is a display. The solar-powered personalized stickers and decals is an illuminated structure. The solar-powered personalized stickers and decals visibly displays an image into the environment. The solar-powered personalized stickers and decals provides the image with illumination that allows the image to be seen at night. The solar-powered personalized stickers and decals is an independently powered device. By independently powered is meant that the solar-powered personalized stickers and decals can illuminate the displayed image without an electric connection to an external power source. The solar-powered personalized stickers and decals comprises a lamp structure, an overlay structure, and a control circuit. The lamp structure and the overlay sheeting structure are flexible sheeting structures. The overlay sheeting structure overlays the lamp structure. The control circuit controls the illumination of the solar-powered personalized stickers and decals.

These together with additional objects, features and advantages of the solar-powered personalized stickers and decals will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar-powered personalized stickers and decals in detail, it is to be understood that the solar-powered personalized stickers and decals is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar-powered personalized stickers and decals.

It is therefore important that the claims be regarded as including such equivalent construction insofar as they do not depart from the spirit and scope of the solar-powered personalized stickers and decals. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
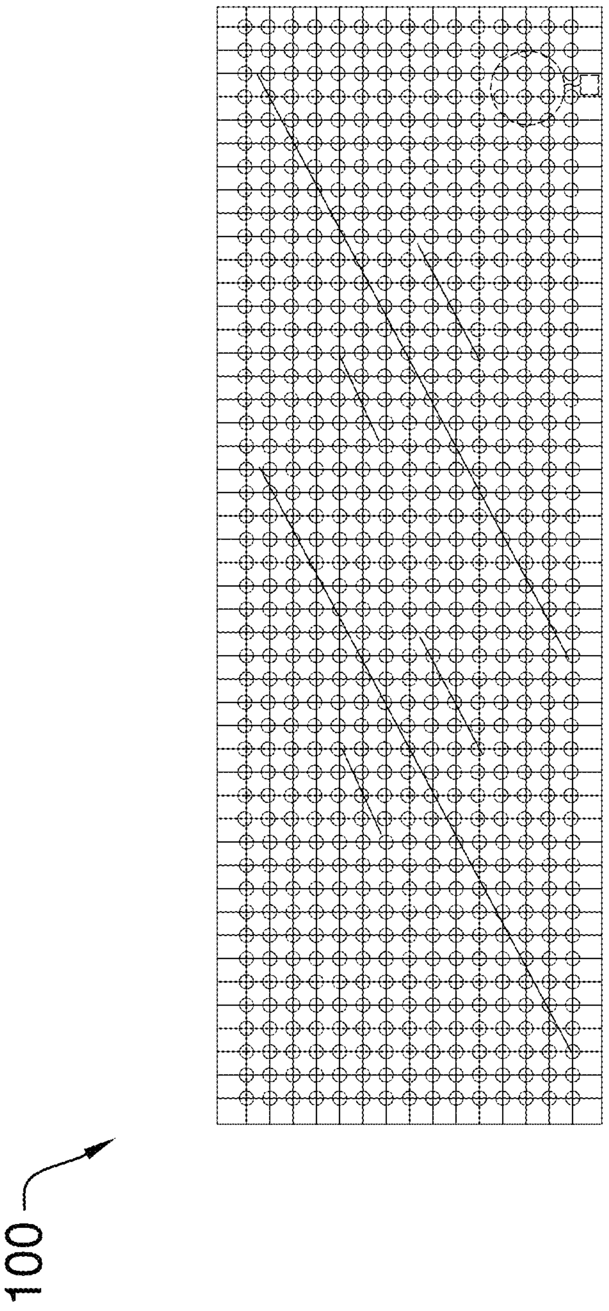
FIG. 1 is a front view of an embodiment of the disclosure.
Figure 2:
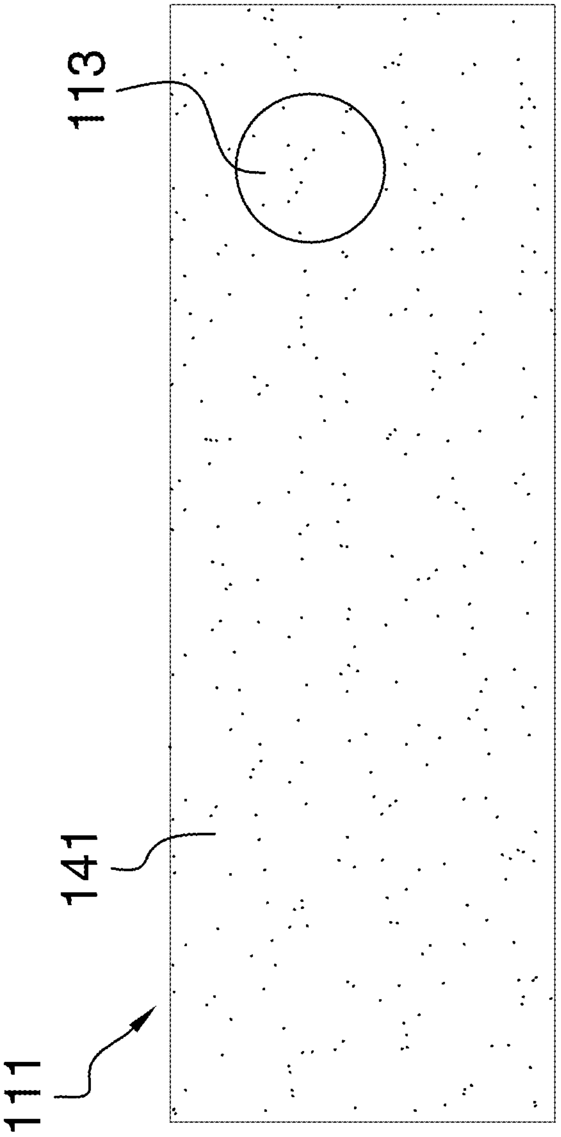
FIG. 2 is a rear view of an embodiment of the disclosure.
Figure 3:
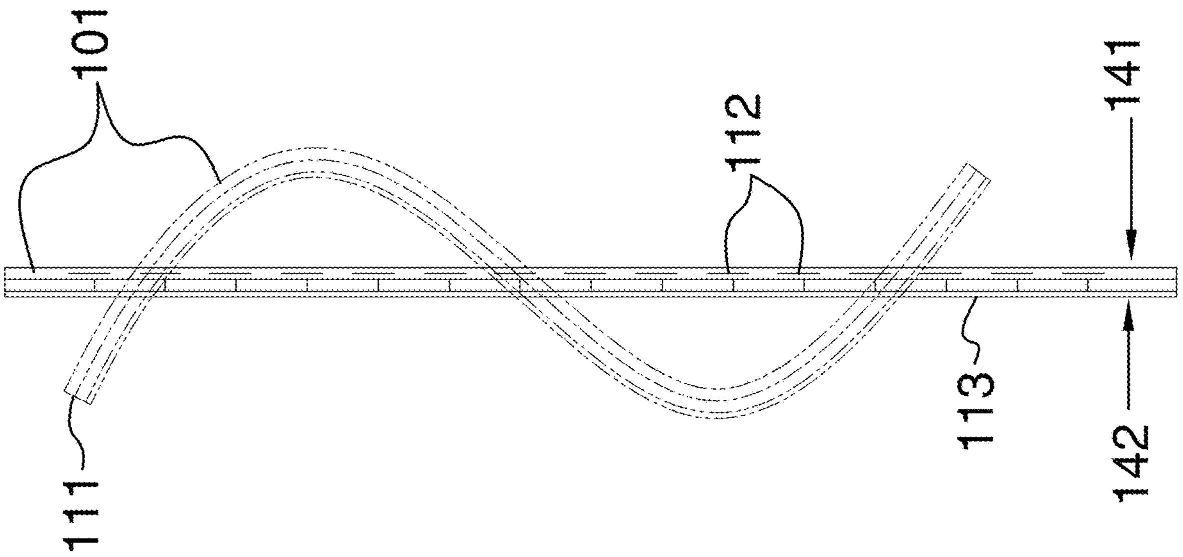
FIG. 3 is a side view of an embodiment of the disclosure.
Figure 4:
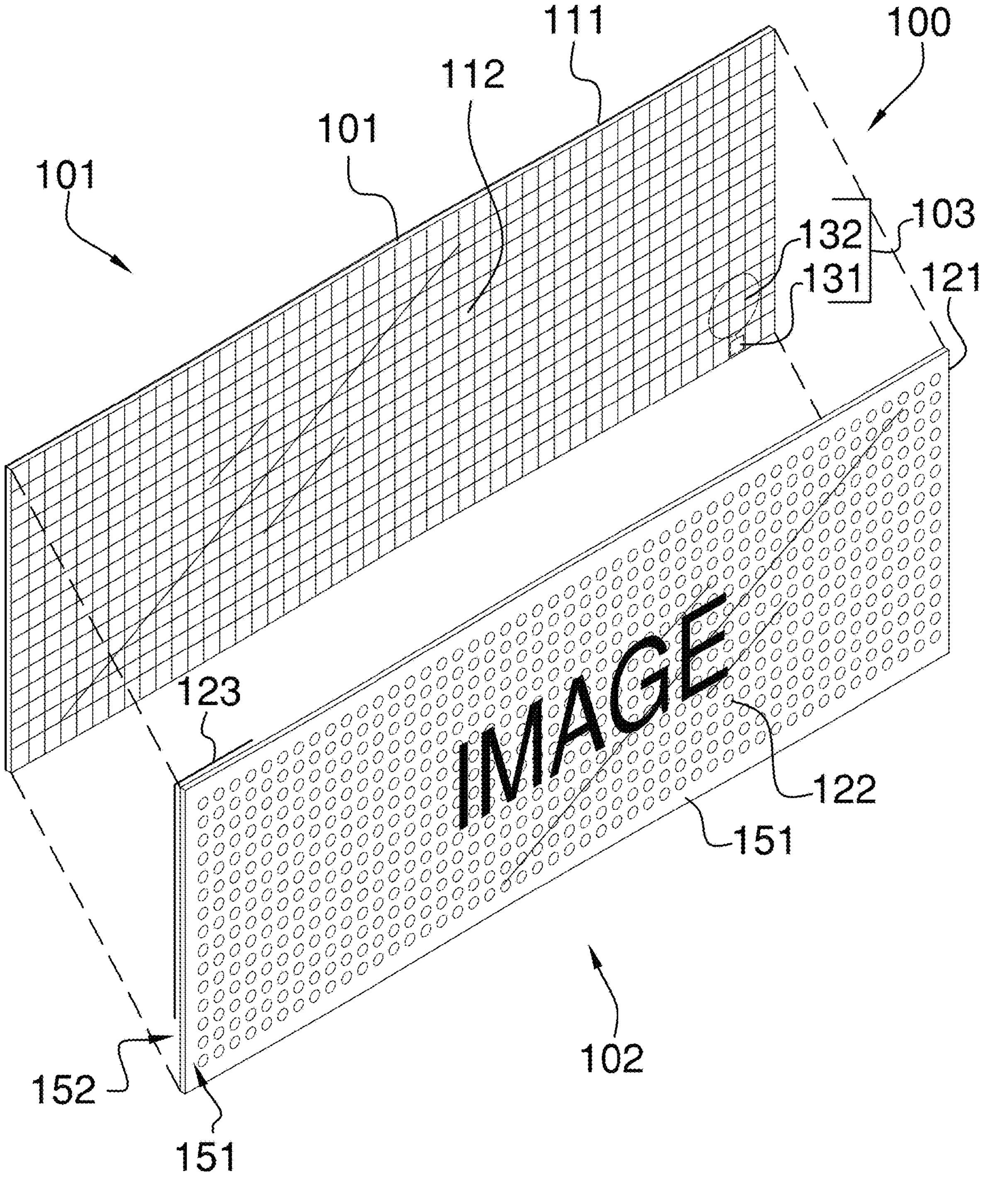
FIG. 4 is an exploded view of an embodiment of the disclosure.
Figure 5:
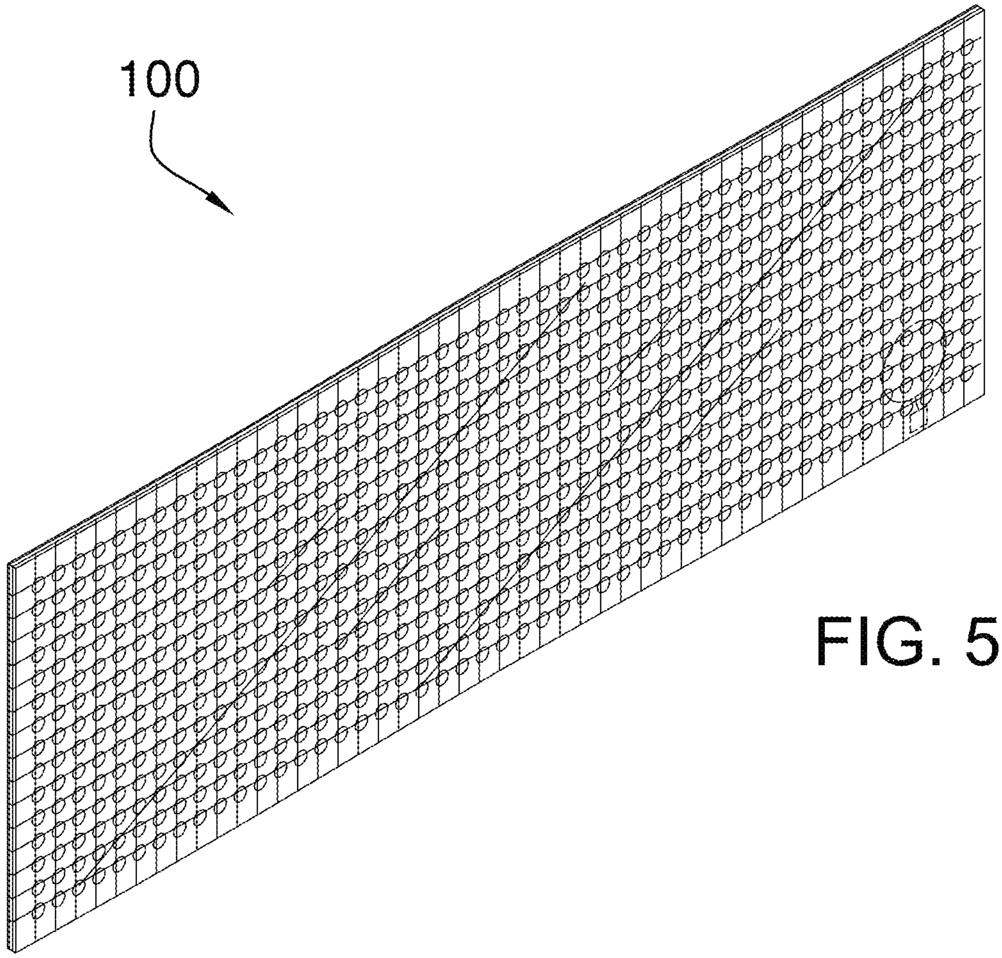
FIG. 5 is a perspective view of an embodiment of the disclosure.
Figure 6:
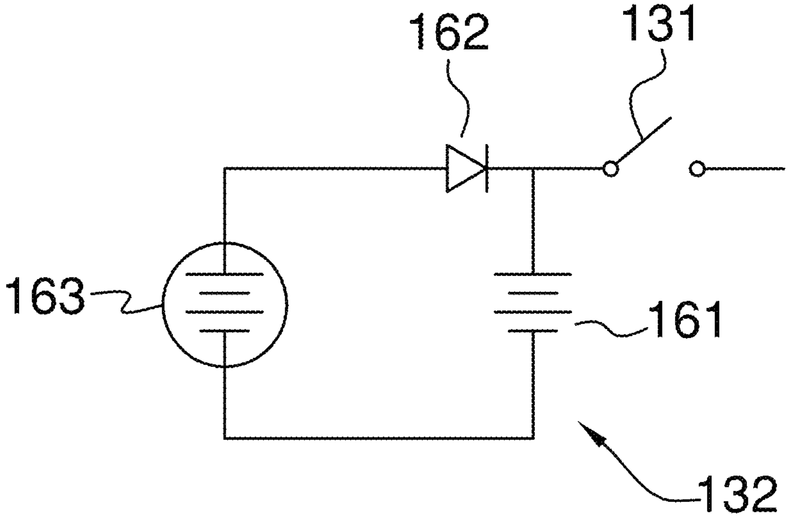
FIG. 6 is a schematic view of an embodiment of the disclosure.

Detailed reference will now be made to one or more potential embodiments of the disclosure, which are illustrated in FIGS. 1 through 6.

The solar-powered personalized stickers and decals 100 (hereinafter invention) is a display. The invention 100 is an illuminated structure. The invention 100 visibly displays an image 122 into the environment. The invention 100 provides the displayed image 122 with illumination that allows the displayed image 122 to be seen at night. The invention 100 is an independently powered device. By independently powered is meant that the invention 100 can illuminate the displayed image 122 without an electric connection to an external power source. The invention 100 comprises a lamp structure 101, an overlay structure 102, and a control circuit 103. The lamp structure 101 and the overlay sheeting structure 102 are flexible sheeting structures. The overlay sheeting structure 102 overlays the lamp structure 101. The control circuit 103 controls the illumination of the invention 100.

The lamp structure 101 is an electrically powered device. The lamp structure 101 forms a lamp. The lamp structure 101 converts electric energy into electromagnetic radiation in a visible spectrum. The lamp structure 101 transmits the generated electromagnetic radiation into the environment. The lamp structure 101 illuminates the overlay structure 102. The lamp structure 101 is a sheeting structure. The lamp structure 101 is a flexible structure. The control circuit 103 permanently attaches to the lamp structure 101. The overlay structure 102 removably attaches to the lamp structure 101. The control circuit 103 transmits the generated electromagnetic radiation from the lamp structure 101 such that the control circuit 103 illuminates the overlay structure 102. The lamp structure 101 comprises a lamp sheeting 111, a led grid structure 112, and a lamp adhesive coating 113.

The lamp sheeting 111 is a sheeting structure. The lamp sheeting 111 is a flexible structure. The lamp sheeting 111 forms the primary structure of the invention 100. The overlay structure 102 removably attaches to the lamp sheeting 111. The control circuit 103 permanently attaches to the lamp sheeting 111. The lamp sheeting 111 further comprises an exterior lamp face 141 and an interior lamp face 142. The exterior lamp face 141 is the face of the lamp sheeting 111 with the greatest surface area. The exterior lamp face 141 is the face of the lamp sheeting 111 that is distal from the overlay structure 102 when the face of the overlay structure 102 is placed on the lamp sheeting 111. The interior lamp face 142 is the face of the lamp sheeting 111 that is distal from the exterior lamp face 141.

The led grid structure 112 is formed from a plurality of leds. The led grid structure 112 mounts on the interior lamp face 142 of the lamp sheeting 111. The led grid structure 112 are laid out on the interior lamp face 142 in a grid pattern. The led grid structure 112 forms the structure of the invention that converts electric energy into electromagnetic radiation in the visible spectrum. The led grid structure 112 is positioned on the lamp sheeting 111 such that the generated electromagnetic radiation is transmitted through the overlay structure 102 into the environment. The led grid structure 112 electrically connects to the control circuit 103. The control circuit 103 controls the illumination of the led grid structure 112.

The lamp adhesive coating 113 is an adhesive coating. The lamp adhesive coating 113 is applied to the exterior lamp face 141 of the lamp sheeting 111. The lamp adhesive coating 113 forms a fastening structure that adheres the invention 100 to a surface.

The overlay structure 102 is a sheeting structure. The overlay structure 102 is a flexible structure. The overlay structure 102 is transparent. The overlay structure 102 detachably attaches to the lamp structure 101 such that the overlay structure 102 forms an interchangeable structure. The transparent structure of the overlay structure 102 allows the electromagnetic radiation generated by the control circuit 103 to be transmitted through the overlay structure 102 into the environment. The electromagnetic radiation transmitted through the overlay structure 102 illuminates the display image 122 that is presented on the overlay structure 102. The overlay structure 102 comprises an overlay sheeting 121, a display image 122, and an overlay adhesive coating 123.

The overlay sheeting 121 is a sheeting structure. The overlay sheeting 121 is a flexible structure. The overlay sheeting 121 is a transparent structure. The overlay sheeting 121 removably attaches to the lamp structure 101. The control circuit 103 transmits the generated electromagnetic radiation from the lamp structure 101 into the environment. The overlay sheeting 121 forms the surface that presents the display image 122. The overlay sheeting 121 further comprises an exterior overlay face 151 and an interior overlay face 152. The interior overlay face 152 is the face of the overlay sheeting 121 with the greatest surface area. The interior overlay face 152 is the face of the overlay sheeting 121 that is adhered to the exterior lamp face 141 of the lamp sheeting 111. The exterior overlay face 151 is the face of the overlay sheeting 121 that is distal from the interior overlay face 152.

The display image 122 is an image that is formed on a face of the overlay sheeting 121. The display image 122 forms a plurality of indicia that generate a sentiment within a viewer. The interchangeable nature of the overlay structure 102 is intended to allow a user to change the display image 122 presented from the invention 100.

The overlay adhesive coating 123 is an adhesive coating. The overlay adhesive coating 123 is formed using a removably adhesive. The overlay adhesive coating 123 is applied to the interior overlay face 152 of the overlay sheeting 121. The overlay adhesive coating 123 forms a fastening structure that removably adheres the interior overlay face 152 of the overlay sheeting 121 to the interior lamp face 142 of the lamp sheeting 111.

The control circuit 103 is an electric circuit. The control circuit 103 converts electric energy into electromagnetic radiation in a visible spectrum. The control circuit 103 transmits the generated electromagnetic radiation through the overlay structure 102 into the environment. The control circuit 103 is an independently powered electric circuit. By independently powered is meant that the control circuit 103 can operate without an electrical connection to an external power source. The control circuit 103 comprises a switch structure 131 and a power circuit 132. The switch structure 131 and the power circuit 132 are electrically interconnected.

The switch structure 131 is an electrical device. The switch structure 131 is a maintained switch. The switch structure 131 forms an electric connection between the power circuit 132 and the led grid structure 112 of the lamp sheeting 111. The switch structure 131 controls the illumination of the led grid structure 112 by controlling the flow of electric energy from the power circuit 132 into the led grid structure 112.

The power circuit 132 is an electrical circuit. The power circuit 132 powers the operation of the control circuit 103. The power circuit 132 is an electrochemical device. The power circuit 132 converts chemical potential energy into the electrical energy required to power the control circuit 103. The power circuit 132 further comprises a battery 161, a diode 162, and a photovoltaic cell circuit 163. The battery 161, the diode 162, and the photovoltaic cell circuit 163 are electrically interconnected.

The battery 161 is a commercially available rechargeable battery 161. The photovoltaic cell 163 is an electrical device that converts light into electrical energy. The chemical energy stored within the rechargeable battery 161 is further renewed and restored through use of the photovoltaic cell 163. The photovoltaic cell 163 is directly wired to the battery 161. The photovoltaic cell 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity. The diode 162 is an electrical device that allows current to flow in only one direction. The second diode 162 installs between the rechargeable battery 161 and the charging port 163 such that electricity will not flow from a first positive terminal of the rechargeable battery 161 into a second positive terminal of the photovoltaic cell 163.

The following definitions were used in this disclosure:

Actuate: As used in this disclosure, to actuate means to initiate the operation of a machine, a device, or a process. The term actuate can be applied to a component of a larger machine, device, or process.

Adhere: As used in this disclosure, to adhere means to attach an object to a surface such that the object remains in a fixed position on the surface. In chemistry, the use of the term adhere often implies the action of molecular bonding or intermolecular forces between the surfaces and the object. The noun form of to adhere is adhesion.

Adhesive: As used in this disclosure, an adhesive is a chemical substance that can be used to adhere two or more objects to each other. Types of adhesives include, but are not limited to, epoxies, polyurethanes, polyimides, or cyano-acrylates, silicone, or latex based adhesives. See removable adhesive, pressure sensitive adhesive, heat activated adhesive.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Battery: As used in this disclosure, a battery is a chemical device consisting of one or more cells, in which chemical energy is converted into electricity and used as a source of power. Batteries are commonly defined with a positive terminal and a negative terminal.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Coating: As used in this disclosure, a coating refers to a substance that is applied to the exterior surface of an object such that the coating forms a new exterior surface of the object. A coating is commonly said to be formed as a layer. Paint is an example of a common coating material.

Color: As used in this disclosure, a color refers to the visible portion of the spectrum that is reflected off of an object that is exposed to an external source of electromagnetic radiation. A color is often referred to as a shade.

Color Spectrum: As used in this disclosure, a color spectrum refers to organization of ranges visible electromagnetic radiation into specific colors. Within this disclosure: a) electromagnetic radiation with wavelengths of 380 nm to 450 nm are called violet; b) electromagnetic radiation with wavelengths of 450 nm to 485 nm are called blue; c) electromagnetic radiation with wavelengths of 485 nm to 500 nm are called cyan; d) electromagnetic radiation with wavelengths of 500 nm to 565 nm are called green; e) electromagnetic radiation with wavelengths of 565 nm to 590 nm are called yellow; f) electromagnetic radiation with wavelengths of 590 nm to 625 nm are called orange; and, g) electromagnetic radiation with wavelengths of 625 nm to 740 nm are called red.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Composite Sheeting: As used in this disclosure, a composite sheeting is a multilayer structure made of two or more joined layers of sheeting materials.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Deformation: As used in this disclosure, the term deformation refers to the application of a force to an object such that the form factor of the object is changed. The infinitive form of deformation is "to deform." An object can be elastically deformed and inelastically deformed. The elastically deformed object will return to its original shape (the relaxed shape) when the deforming force is removed. The inelastically deformed object will not return to its original shape when the deforming force is removed.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a structure that is intended to visually present an object, image, or concept to an individual.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Electromagnetic Radiation: As used in this disclosure, electromagnetic radiation refers to an interaction between electric fields and magnetic fields that is capable of transmitting energy through a vacuum.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Field of Illumination: As used in this disclosure, a field of illumination refers to an area illuminated by electromagnetic radiation projected from an electrical device such as a lamp or transmission antenna.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Frame: As used in this disclosure, a frame is a structure or a first sub-structure: a) to which an object or a second sub-structure attaches; and, b) which forms a portion of the load path of the object or the second sub-structure.

Framework: As used in this disclosure, a framework refers to the substructure of an object that forms a load path for the object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grid: As used in this disclosure, a grid is a network of intersecting parallel and perpendicular lines. The rectangular space within a grid that is bounded by two adjacent parallel lines and two adjacent parallel lines is called a cell. A dot grid pattern refers to a grid that is represented by an image that displays only the points of intersection formed at the intersection of each parallel and perpendicular line that forms the grid.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hue: As used in this disclosure, a hue refers to a specific color.

Illumination: As used in this disclosure, illumination refers to electromagnetic radiation contained with an area. Illumination is a synonym for light, particularly in cases where a measure of the amount of visible electromagnetic radiation in a space is called for. The verb form of illumination is to illuminate and is taken to mean the generation of an illumination.

Image: As used in this disclosure, an image is an optical representation or reproduction of an indicia or of the appearance of something or someone. See indicia sentiment optical character recognition.

Indicia: As used in this disclosure, the term indicia refers to a set of markings that identify a sentiment.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interchangeable: As used in this disclosure, interchangeable refers to the ability to remove and replace an element of a structure. For example, if a first object that is attached to a structure can be removed and replaced with a second object selected from a plurality of compatible objects than the first object is said to be interchangeable with both: 1) the second object; and, 2) each of the elements of compatible objects. The term interchangeable is commonly associated with tools. Interchangeable objects are often used to change the function or the performance characteristics of a tool. Replaceable is a synonym for interchangeable.

Interior: As used in this disclosure, the interior is used as a relational term that implies that an object is contained within the boundary of a structure or a space.

Lamp: As used in this disclosure, a lamp is an electrical circuit that generates (typically visible spectrum) electromagnetic radiation.

LED: As used in this disclosure, an LED is an acronym for a light emitting diode. A light emitting diode is a diode that is also a light source.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load of an Object: As used in this disclosure, the term load of an object refers to an object that is inserted into a load path. The load of an object refers to the sum of the forces (including the force of gravity) that are applied to the object.

Maintained Switch: As used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Overlay: As used in this disclosure, an overlay refers to the placement of a second structure over a first structure such that a portion of the first structure is visible through or around the second structure.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Present: As used in this disclosure, to present means to bring an object, image, or concept to the attention of an individual.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radiation: As used in this disclosure, radiation refers to the discharge of energy from an object. The term is often applied to energy in the form of: a) waves, such as electromagnetic radiation or acoustic energy; b) nuclear radiation such as alpha, beta, and gamma, particle radiation; and, c) gravitational waves. The radiation of electromagnetic waves is often classified by the wavelength of the generated waves, such as ultraviolet and infrared radiation.

Relaxed Shape: As used in this disclosure, a structure is considered to be in its relaxed state when no shear, strain, or torsional forces are being applied to the structure.

Removable Adhesive: As used in this disclosure, a removable adhesive is a commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives. A removable adhesive is often called fugitive glue.

Roughly: As used in this disclosure, roughly refers to a comparison between two objects. Roughly means that the difference between one or more parameters of the two compared objects are not significantly different.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sentiment: As used in this disclosure, a sentiment refers to a symbolic meaning or message that is communicated through the use of an object or an image, potentially including a text based image.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Sign: As used in this disclosure, a sign is a placard that displays an image, potentially including a text based image, which contains some form of a sentiment.

Spectrum: As used in this disclosure, a spectrum refers to the distribution and amplitude of the component frequencies of a source of electromagnetic radiation. Spectrums are typically organized and displayed by frequency or frequency range.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch, respectively. Completing or interrupting an electric circuit is also often referred to as making or breaking the circuit, respectively.

Transparent: As used in this disclosure, transparent refers to a material that allows light to pass through the material without significant scattering such that an object can be clearly seen through the material.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

Visible Light: As used in this disclosure, visible light refers electromagnetic radiation with a wavelength in the approximate range of 400 nanometers to 800 nanometers.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A solar-powered personalized stickers and decals comprising a lamp structure, an overlay structure, and a control circuit;

wherein the lamp structure and the overlay sheeting structure are flexible sheeting structures;

wherein the overlay sheeting structure overlays the lamp structure;

wherein the control circuit controls the illumination of the solar-powered personalized stickers and decals;

wherein the lamp structure comprises a lamp sheeting, a led grid structure, and a lamp adhesive coating;

wherein the lamp sheeting forms the primary structure of the solar-powered personalized stickers and decals;

wherein the overlay structure removably attaches to the lamp sheeting;

wherein the control circuit permanently attaches to the lamp sheeting;

wherein the lamp sheeting further comprises an exterior lamp face and an interior lamp face;

wherein the exterior lamp face is the face of the lamp sheeting that is distal from the overlay structure when the face of the overlay structure is placed on the lamp sheeting;

wherein the interior lamp face is the face of the lamp sheeting that is distal from the exterior lamp face;
wherein the led grid structure is formed from a plurality of leds;
wherein the led grid structure mounts on the interior lamp face of the lamp sheeting;
wherein the led grid structure are laid out on the interior lamp face in a grid pattern;
wherein the led grid structure forms the structure of the solar-powered personalized stickers and decals that converts electric energy into electromagnetic radiation in the visible spectrum;
wherein the led grid structure is positioned on the lamp sheeting such that the generated electromagnetic radiation is transmitted through the overlay structure into the environment;
wherein the led grid structure electrically connects to the control circuit;
wherein the control circuit controls the illumination of the led grid structure;
wherein the lamp adhesive coating is applied to the exterior lamp face of the lamp sheeting;
wherein the lamp adhesive coating forms a fastening structure that adheres the solar-powered personalized stickers and decals to a surface.

2. The solar-powered personalized stickers and decals according to claim 1
wherein the solar-powered personalized stickers and decals is a display;
wherein the solar-powered personalized stickers and decals is an illuminated structure;
wherein the solar-powered personalized stickers and decals visibly displays an image into the environment;
wherein the solar-powered personalized stickers and decals provides the displayed image with illumination that allows the displayed image to be seen at night;
wherein the solar-powered personalized stickers and decals is an independently powered device;
wherein by independently powered is meant that the solar-powered personalized stickers and decals can illuminate the displayed image without an electric connection to an external power source.

3. The solar-powered personalized stickers and decals according to claim 2
wherein the lamp structure is an electrically powered device;
wherein the lamp structure forms a lamp;
wherein the lamp structure converts electric energy into electromagnetic radiation in a visible spectrum;
wherein the lamp structure transmits the generated electromagnetic radiation into the environment;
wherein the lamp structure illuminates the overlay structure;
wherein the lamp structure is a sheeting structure;
wherein the lamp structure is a flexible structure;
wherein the control circuit permanently attaches to the lamp structure;
wherein the overlay structure removably attaches to the lamp structure;
wherein the control circuit transmits the generated electromagnetic radiation from the lamp structure such that the control circuit illuminates the overlay structure.

4. The solar-powered personalized stickers and decals according to claim 3
wherein the overlay structure is a sheeting structure;
wherein the overlay structure is a flexible structure;
wherein the overlay structure is transparent;
wherein the overlay structure detachably attaches to the lamp structure such that the overlay structure forms an interchangeable structure;
wherein the transparent structure of the overlay structure allows the electromagnetic radiation generated by the control circuit to be transmitted through the overlay structure into the environment;
wherein the electromagnetic radiation transmitted through the overlay structure illuminates the display image that is presented on the overlay structure.

5. The solar-powered personalized stickers and decals according to claim 4
wherein the control circuit is an electric circuit;
wherein the control circuit converts electric energy into electromagnetic radiation in a visible spectrum;
wherein the control circuit transmits the generated electromagnetic radiation through the overlay structure into the environment;
wherein the control circuit is an independently powered electric circuit;
wherein by independently powered is meant that the control circuit can operate without an electrical connection to an external power source.

6. The solar-powered personalized stickers and decals according to claim 5
wherein the overlay structure comprises an overlay sheeting, a display image, and an overlay adhesive coating;
wherein the overlay sheeting is a sheeting structure;
wherein the overlay sheeting is a flexible structure;
wherein the overlay sheeting is a transparent structure;
wherein the overlay sheeting removably attaches to the lamp structure;
wherein the control circuit transmits the generated electromagnetic radiation from the lamp structure into the environment;
wherein the overlay sheeting forms the surface that presents the display image;
wherein the overlay sheeting further comprises an exterior overlay face and an interior overlay face;
wherein the interior overlay face is the face of the overlay sheeting with the greatest surface area;
wherein the interior overlay face is the face of the overlay sheeting that is adhered to the exterior lamp face of the lamp sheeting;
wherein the exterior overlay face is the face of the overlay sheeting that is distal from the interior overlay face;
wherein the display image is an image that is formed on a face of the overlay sheeting;
wherein the display image forms a plurality of indicia that generate a sentiment within a viewer;
wherein the interchangeable nature of the overlay structure is intended to allow a user to change the display image presented from the solar-powered personalized stickers and decals;
wherein the overlay adhesive coating is an adhesive coating;
wherein the overlay adhesive coating is formed using a removably adhesive;
wherein the overlay adhesive coating is applied to the interior overlay face of the overlay sheeting;
wherein the overlay adhesive coating forms a fastening structure that removably adheres the interior overlay face of the overlay sheeting to the interior lamp face of the lamp sheeting.

7. The solar-powered personalized stickers and decals according to claim 6 wherein the control circuit comprises a switch structure and a power circuit;

wherein the switch structure and the power circuit are electrically interconnected;

wherein the switch structure is an electrical device;

wherein the switch structure is a maintained switch;

wherein the switch structure forms an electric connection between the power circuit and the led grid structure of the lamp sheeting;

wherein the switch structure controls the illumination of the led grid structure by controlling the flow of electric energy from the power circuit into the led grid structure;

wherein the power circuit is an electrical circuit;

wherein the power circuit powers the operation of the control circuit;

wherein the power circuit is an electrochemical device;

wherein the power circuit converts chemical potential energy into the electrical energy required to power the control circuit;

wherein the power circuit further comprises a battery, a diode, and a photovoltaic cell circuit;

wherein the battery, the diode, and the photovoltaic cell circuit are electrically interconnected;

wherein the battery is a rechargeable battery;

wherein the photovoltaic cell is an electrical device that converts light into electrical energy;

wherein the photovoltaic cell is wired to the battery;

wherein the photovoltaic cell is an electrical circuit that reverses the polarity of the rechargeable battery;

wherein the diode is an electrical device that allows current to flow in only one direction;

wherein the second diode installs between the rechargeable battery and the charging port such that electricity will not flow from the rechargeable battery into the photovoltaic cell.

* * * * *